United States Patent

[11] 3,524,399

| [72] | Inventor | Hoy R. Bohanon |
| | | Muskogee, Oklahoma |
| [21] | Appl. No. | 834,741 |
| [22] | Filed | June 19, 1969 |
| [45] | Patented | Aug. 18, 1970 |
| [73] | Assignee | Acme Engineering and Manufacturing Corporation |
| | | Muskogee, Oklahoma |
| | | a Corp. of Oklahoma |

[54] HEATING, VENTILATING AND CIRCULATING AIR SYSTEM
10 Claims, 7 Drawing Figs.

[52] U.S. Cl. .................................................. 98/33,
    98/38, 165/122
[51] Int. Cl. .................................................. F24f 13/00
[50] Field of Search .......................................... 236/37, 38;
    165/122; 98/37, 39, 43

[56] References Cited
UNITED STATES PATENTS
2,525,685  10/1950  Kompart ..................... 236/38
3,307,469  3/1967  Bohanon .....................
3,474,720  10/1969  Qualley .....................

Primary Examiner— Meyer Perlin
Attorney— Brufsky, Staas, Breiner and Halsey

ABSTRACT: A heating, ventilating and circulating air system featuring a distribution fan spaced from an adjustable opening within a wall of a building, one or more unit heaters arranged to discharge heated air into the space between the distribution fan and the adjustable opening, an air distribution tube secured to the discharge end of the distribution fan and provided with openings throughout for jetting air into the building and an exhaust fan mounted within a wall of the building. During the circulating mode of operation, the distribution fan is running, the adjustable wall opening is closed, and the unit heater(s) and exhaust fan are inoperative. During the ventilating mode of operation, the distribution and exhaust fans are running, the adjustable wall opening is open and the unit heater(s) are inoperative. During the heating mode of operation, the distribution fan and unit heater(s) are operating, the adjustable opening is closed and the exhaust fan is inoperative.

Patented Aug. 18, 1970

INVENTOR
HOY R. BOHANON

INVENTOR
HOY R. BOHANON

Patented Aug. 18, 1970

INVENTOR
HOY R. BOHANON

HEATING, VENTILATING AND CIRCULATING AIR SYSTEM

BACKGROUND AND SUMMARY OF THE INVENTION

It is frequently desirable to intermittently distribute cold and heated air within buildings. Greenhouses, for example, require large ventilating air flow rates during daytime hours of bright sunshine and large heat input rates during cold nighttime hours. Similarly, buidings containing animals which generate varying amounts of heat also require effective distribution of cold and warm air.

Heretofore, greenhouses have been equipped with separate ventilating and heating systems. Ventilating systems have been used which pull outside air through openings in the building wall distributing the air with one or more fans, which may be connected to tubing provided with openings through which the air is jetted. For a complete discussion of a combination ventilating and circulating air system designed to provide during winter large quantities of fresh outdoor air for ventilation without creating cold drafts and continuous circulation of air that is evenly distributed, reference is made to U.S. Patent No. 3,307,469, issued March 7, 1967, and entitled Ventilating and Circulating Air System, incorporated herein by reference. When heating is desired it is the usual practice in the industry to employ a separate heating and distribution system, such as unit heaters or steam pipes. In poultry houses, gas fired heaters are frequently used to supply heat.

If the same air distribution system is used for both heating and ventilating, performance is better than when using separate systems. Also, the cost is reduced substantially, a factor of considerable importance in horticultural and animal husbandry installations.

Where uniformity of temperature is important a cycle in which air is continuously recirculated within the building should be provided in addition to the heating and ventilating cycles. In this manner, the air within the building can be mixed obtaining the desired uniformity.

Good air distribution is usually available in existing ventilating systems. It follows then that if the heating system is incorporated into the existing air distribution system of the ventilating system, higher hot air flow rates will be available. In this manner, response to temperature changes is speeded up avoiding excessive introduction of cold and hot air and resulting large variations in temperature.

With the present invention, heating, ventilating and circulating is accomplished with a single air distribution system resulting in higher performance and lower cost than available in presently marketed dual heating and ventilating systems. A distribution fan is mounted within the enclosure a predetermined distance opposite an opening in the building wall within which is mounted an adjustable shutter. One or two commercial unit heaters, each containing a heating element and a fan to blow air over the heating element, are arranged to discharge heated air into the "gap" between the adjustable opening in the building wall and the distribution fan. The distribution fan is connected to a distribution tube extending throughout the enclosure. The distribution tube is provided with spaced openings through which air is jetted into the enclosure. Finally, an exhaust fan is mounted in the building wall.

Three separate modes of operation are available using the single air distribution system. Circulation of inside air is accomplished by running the distribution fan while the shutter is closed and all other components inoperative. Ventilation is accomplished by running the distribution and exhaust fans while the shutter is open and the unit heaters inoperative. Heating is accomplished by running the distribution fan and the unit heaters while the shutter is closed and the exhaust fan inoperative. Conventional automatic controls are employed to sequentially actuate the heating, ventilating and circulating cycles in response to temperature and/or humidity requirements within the enclosure. For large buildings, several systems are employed.

DETAILED DESCRIPTION OF THE PREFERRED EMBODIMENTS

Figure 1:
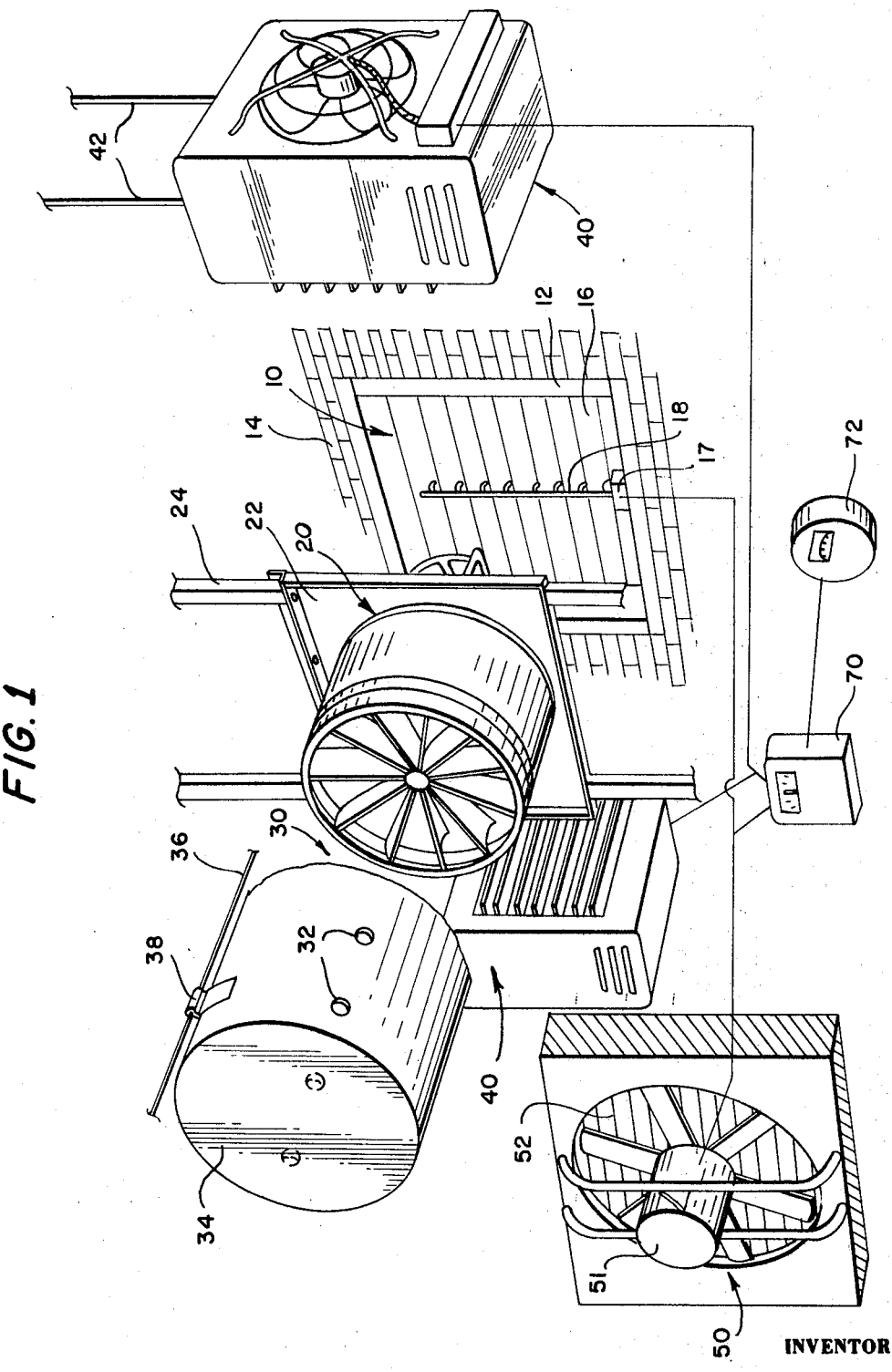
FIGURE 1 is a perspective view of the heating, ventilating and circulating air system.

The components of the heating, ventilating and circulating air system of the present invention are illustrated in FIGURE 1 and include motorized shutter 10 mounted within opening 12 of a wall 14 of the building. In conventional manner, motorized shutter 10 contains a plurality of balanced blades 16 operable by motor 17 through actuating rod 18.

Spaced directly opposite motorized shutter 10 is distribution fan 20 suitably supported within the enclosure, for example, by frame 22 and supports 24. The discharge of distribution fan 20 is connected to tube 30 which extends throughout the building. Spaced openings 32 are provided throughout tube 30 while the end 34 is closed. Tube 30 is suspended within the enclosure by suitable means which may, for example, include wire 36 and clip assemblies 38. For further information regarding clip assemblies 38, attention is directed to U.S. Patent No. 3,318,224 issued May 9, 1967 and entitled Ventilating and Circulating Air System Tube Hanger.

One or two commercial unit heaters 40, each containing a heating element and blower, are suitably mounted within the enclosure, for example, by rods 42, to discharge heated air into the space or gap defined between shutter 10 and the inlet of distribution fan 20.

Finally, exhaust fan 50 run by motor 51 and equipped with shutter 52 is mounted within a wall of the building.

Figure 2:
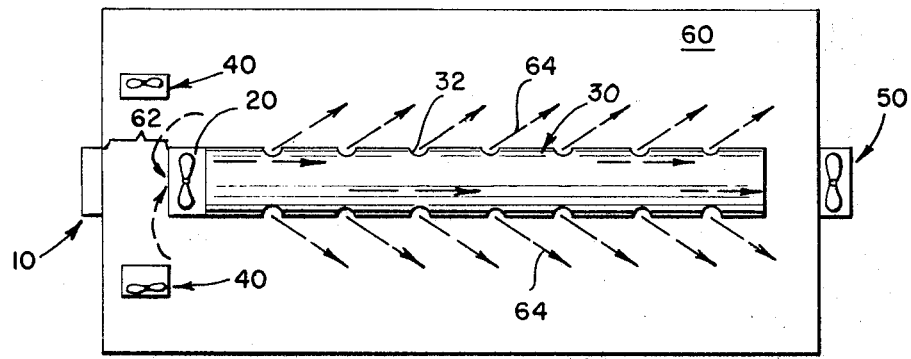
FIGURE 2 is a plan view illustrating schematically the circulating mode of operation.

During the circulating mode of operation, illustrated in FIGURE 2, distribution fan 20 is running while all other components of the system are inoperative, i.e., shutter 10 is closed and unit heaters 40 and exhaust fan 50 are shut off. Distribution fan 20 pulls air from within enclosure 60 through the spare or gap 62 between distribution fan 20 and shutter 10 into its inlet discharging the indoor air under pressure into tube 30 after which the air is introduced into enclosure 60 through openings 32 at high velocity along a plurality of small jets 64. Jets 64 mix rapidly with the surrounding room air homogenizing the air with enclosure 60 preventing stratification.

Figure 3:
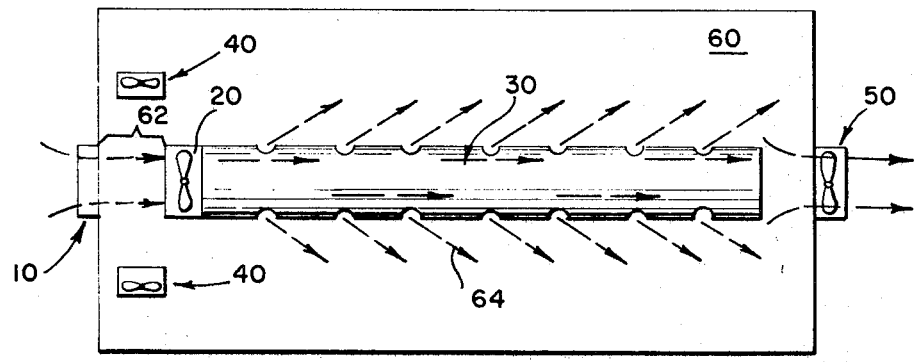
FIGURE 3 is a plan view illustrating schematically the ventilating mode of operation.

During the ventilating mode of operation, illustrated in FIGURE 3, distribution fan 20 and exhaust fan 50 are running, and shutter 10 is open and unit heaters 40 are inoperative. Exhaust fan 50 removes air from enclosure 60 creating a negative pressure pulling outside air through the open shutter 10. The cold outside air jumps the gap 62 between shutter 10, enters distribution fan 20, is discharged under pressure into distribution tube 30, and jetted into the enclosure 60. Although this outside air is often much colder than the air which has been circulating within enclosure 60, it is rapidly mixed with the room air after being discharged in small jets 64 from distribution tube 30 achieving a uniform mixture with no cold drafts.

Figure 4:
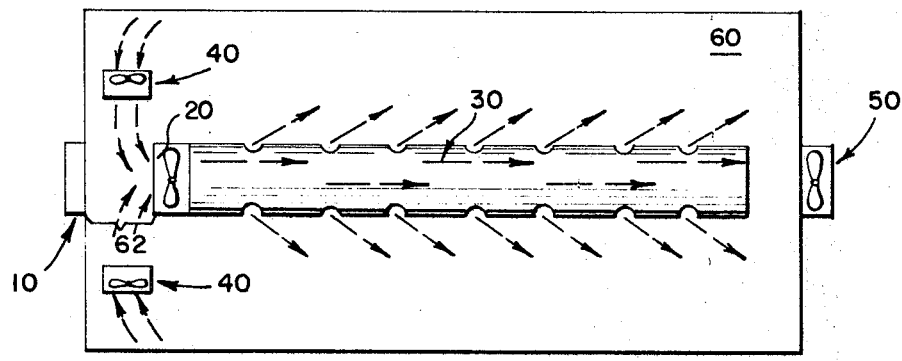
FIGURE 4 is a plan view illustrating schematically the heating mode of operation.

During the heating mode of operation, illustrated in FIGURE 4, distribution fan 20 and the unit heaters 40 are operating, shutter 10 is closed and exhaust fan 50 is inoperative. Heated air from unit heaters 40 is directed across the space separating the unit heaters 40 from distribution fan 20, enters gap 62 and is drawn into the inlet of distribution fan 20. The heated air is propelled under pressure down distribution tube 30 and jetted throughout enclosure 60 rapidly mixing the heated air with room air producing a uniform mixture of warm air throughtout enclosure 60.

As will be apparent, the heating, ventilating and circulating system disclosed herein is readily adaptable for use with automatic controls which may include, as schematically illustrated in FIGURE 1, thermostats 70 as well as high limit humidistats 72. Thus, air within enclosure 60 is continuously circulated, with a predetermined rise in temperature actuating the ventilating cycle, a predetermined drop in temperature actuating the heating cycle and a predetermined rise in humidity actuating either the ventilating or the heating cycle. In practice, the system switches from the circulating mode to the heating or ventilating modes and back several times an hour depending on the degree of uniformity required in the building.

Conventional automatic control is achieved, for example, by providing an electrical switch for actuating motor 17 of shutter assembly 10 and motor 51 of exhaust fan 50 and another electrical switch for actuating unit heaters 40, the switches being responsive to command from thermostats 70 and/or humidistats 72. Since each system must be designed to fit the needs of a particular building, the necessary electrical circuitry will vary from one installation to another, but is within the skill of an ordinary electrician.

Figure 5:
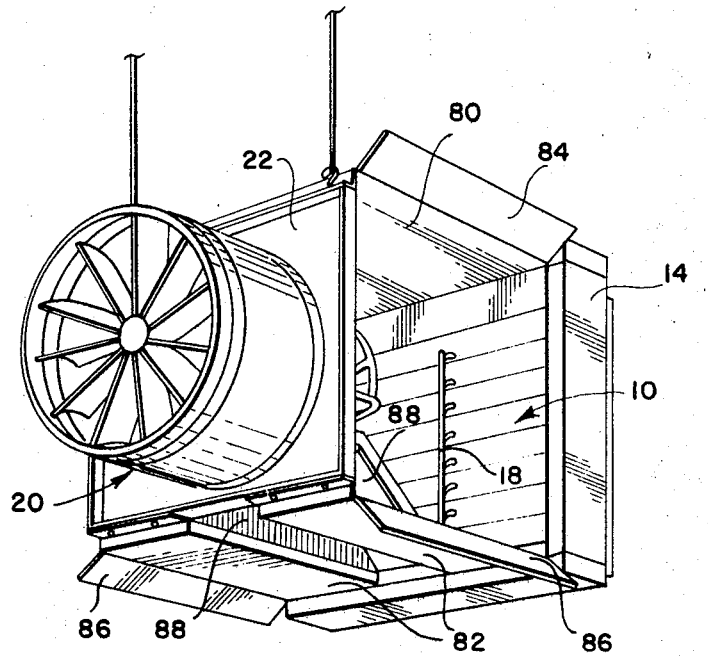
FIGURE 5 is a perspective view illustrating air guides used to conduct hot air from the unit heaters to the distribution fan inlet while directing cool room air over the fan motor.
Figure 6:
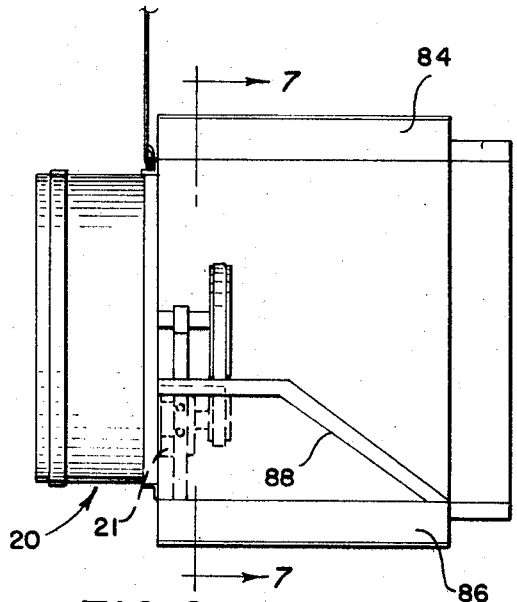
FIGURE 6 is a side view of the installed air guides.
Figure 7:
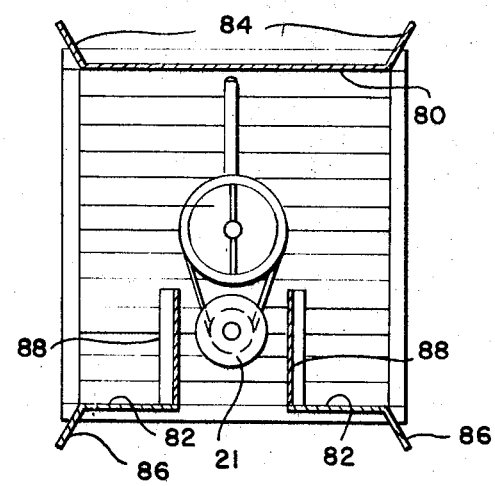
FIGURE 7 is a cross-sectional view taken along line 7-7 of FIGURE 6.

As seen in FIGURES 5-7, air guides 80 and 82 may be employed to conduct hot air from unit heaters 40 to the inlet of distribution fan 20, particularly if the air flow rate of the unit heaters 40 is a large fraction of the air flow rate of distribution fan 20. The guides 80 and 82 may also be designed to direct cool room air over motor 21 of distribution fan 20.

Guide 80 extends across gap 62 and is secured to frame 22 and wall 14, the ends 84 thereof being bent upwardly to deflect air.

In similar manner, guides 82 extend across gap 62 and terminate in ends 86 bent downwardly to deflect air. The opposite ends 88 of guides 82 being vertically disposed shield motor 21 from hot air delivered by unit heaters 40 while directing cool room air over motor 21. Although distribution fan 20 is illustrated as belt driven, it will be apparent that differently designed air guides may be employed for direct driven fans.

Certain fundamentals must be observed when installing the present heating, ventilating and circulating air system. The air flow rate of exhaust fan 50 should not exceed the air flow rate of distribution fan 20. The air flow rate of the unit heater(s) 40 should not exceed the air flow rate of distribution fan 20. The effective area of wall opening 12, defined by motorized shutter 10, should be sized according to the air flow rate of distribution fan 20.

The number and size of openings 32 along tube 30 determines how far each individual jet 64 will penetrate into the room air and relates to the diameter and length of distribution tube 30. Experimentation indicates that from two to three inches is the proper diameter of openings 32 while the spacing between openings 32 must be such that the total or aggregate area of openings 32 has the proper relationship to the cross-sectional area and length of tube 30 and fan capacity. For tubes that are less than 100 diameters long, the ratio of total opening area to tube cross-sectional area should range from 1.0 to 1.5 for most fans.

The pressure distribution in tube 30 is such that the pressure at the closed end 34 is more than at the end adjacent distribution fan 20. If this ratio is too great, there is danger that the pressure at the fan end will go below room pressure causing reverse flow through openings 32 or collapse of tube 30 if made from flexible material. On the other hand, if the total opening area is too small, it will restrict the flow of distribution fan 20 and reduce significantly the performance of the system as a whole.

While the location of openings 32 is important, and varies somewhat with each application, for most instances, a location within 30° of the horizontal center line of tube 30 is preferred.

It is preferred that exhaust fan 50 be located in generally opposed relation to distribution fan 20.

The use of stator vanes in distribution fan 20 eliminates flutter and subsequent tearing of adjacent portions of tube 30 by preventing violent discharge vorticity as in conventional tube fans. In addition, the use of stator vane type fans recovers the rotational energy of the discharging air stream improving performance and efficiency generally.

The size and number of fan units will be determined by the ventilating requirements of the building and its contents while distribution tubes 30 are arranged to distribute air uniformly within the building enclosure.

Although distribution tube 30 may be made of virtually any material, cost factors presently dictate the use of thin film plastic. As tube 30 is non-rigid, fan air pressure holds it in its contemplated shape during use.

Manifestly, variation in arrangement of component parts may be envisioned without departing from the spirit and scope of invention as defined by the sub-joined claims.

I claim:
1. A heating, ventilating and recirculating air system for an enclosure, comprising:
  A) adjustable opening means mounted within a wall of the enclosure;
  B) a distribution fan mounted within the enclosure and having an inlet located a predetermined distance from said adjustable opening means;
  C) a distribution tube connected to the discharge of said distribution fan and including a plurality of spaced openings for distributing air within the enclosure;
  D) a unit heater mounted within the enclosure near said distribution fan and adjustable opening means so as to direct air between the inlet of said distribution fan and said adjustable opening means, said unit heater containing a heating element and fan to move air over said heating element; and
  E) an exhaust fan mounted within a wall of the enclosure.

2. A heating, ventilating and recirculating air system as in Claim 1, wherein said distribution fan is mounted opposite said adjustable opening means and directly exposed to the inside of the enclosure through a space between said distribution fan and adjustable opening means.

3. A heating, ventilating and recirculating air system as in Claim 1, including means guiding the hot air from said unit heater to the inlet of said distribution fan.

4. A heating, ventilating and recirculating air system for an enclosure, comprising:
  A) adjustable opening means mounted within a wall of the enclosure;
  B) a distribution fan mounted within the enclosure opposite said adjustable opening means and having an inlet spaced from said adjustable opening means;
  C) a distribution tube connected to the discharge of said distribution fan and including a plurality of spaced openings for distributing air within said enclosure;
  D) a unit heater mounted within the enclosure and to one side of said distribution fan and adjustable opening means so as to direct air into the space defined between the inlet of said distribution fan and said adjustable opening means, said unit heater containing a heating element and fan to move air over the heating element;
  E) an exhaust fan mounted within a wall of the enclosure; and
  F) means sequentially recirculating inside air by running said distribution fan while said adjustable opening means is closed and said unit heater and exhaust fan are inoperative, ventilating by running said distribution and exhaust fans while said adjustable opening means is open and said unit heater is inoperative and heating by running said distribution fan and unit heater while said adjustable opening means is closed and said exhaust fan is inoperative.

5. A heating, ventilating and recirculating air system as in Claim 4, including means responsive to temperature changes within the enclosure for regulating the recirculating, ventilating and heating cycles.

6. A heating, ventilating and recirculating air system for an enclosure, comprising:
   A) adjustable opening means mounted within a wall of the enclosure;
   B) a distribution fan mounted within the enclosure opposite said adjustable opening means and having an inlet spaced from said adjustable opening means;
   C) a distribution tube connected to the discharge of said distribution fan and including a plurality of spaced openings for distributing air within the enclosure;
   D) two separate unit heaters mounted within the enclosure on opposite sides of said distribution fan and adjustable opening means, said unit heaters facing each other so as to direct air into the space defined between said distribution fan inlet and adjustable opening means, said unit heaters each containing a heating element and fan to move air over the heating element; and
   E) an exhaust fan mounted within a wall of the enclosure.

7. A heating, ventilating and recirculating air system as in Claim 6, including means sequentially recirculating inside air by running said distribution fan while said adjustable opening means is closed and said unit heaters and exhaust fan are inoperative, ventilating by running said distribution and exhaust fans while said adjustable opening means is open and said unit heaters are inoperative and heating by running said distribution fan and unit heaters while said adjustable opening means is closed and said exhaust fan is inoperative.

8. A heating, ventilating and recirculating air system as in Claim 7, including means responsive to temperature changes within the enclosure for regulating the recirculating, ventilating and heating cycles.

9. A heating, ventilating and recirculating air system as in Claim 6, including means guiding the hot air from said unit heaters to the inlet of said distribution fan.

10. A heating, ventilating and recirculating air system as in Claim 6, including means directing cool room air over said distribution fan.